United States Patent
Caillon et al.

(10) Patent No.: US 8,672,140 B2
(45) Date of Patent: Mar. 18, 2014

(54) METHOD OF STORING A PLURALITY OF ARTICLES WITH INFORMATION BEING SCRUTINIZED

(75) Inventors: Christophe Caillon, Bretigny sur Orge (FR); Herve Lagrange, Paris (FR)

(73) Assignee: Solystic, Gentilly Cedex (FR)

( * ) Notice: Subject to any disclaimer, the term of this patent is extended or adjusted under 35 U.S.C. 154(b) by 577 days.

(21) Appl. No.: 12/532,038

(22) PCT Filed: Jul. 6, 2009

(86) PCT No.: PCT/FR2009/051330
§ 371 (c)(1),
(2), (4) Date: Sep. 18, 2009

(87) PCT Pub. No.: WO2010/004203
PCT Pub. Date: Jan. 14, 2010

(65) Prior Publication Data
US 2011/0215035 A1    Sep. 8, 2011

(30) Foreign Application Priority Data
Jul. 11, 2008  (FR) .................................... 08 54751

(51) Int. Cl.
*B07C 5/00*  (2006.01)

(52) U.S. Cl.
USPC ......................................... 209/552; 209/562

(58) Field of Classification Search
USPC ...................................................... 209/552
See application file for complete search history.

(56) References Cited

U.S. PATENT DOCUMENTS

| | | | | |
|---|---|---|---|---|
| 5,311,999 A * | 5/1994 | Malow et al. | ................. | 209/583 |
| 5,422,821 A * | 6/1995 | Allen et al. | .................... | 700/219 |
| 5,468,945 A * | 11/1995 | Huggett et al. | .......... | 235/462.02 |
| 5,703,783 A * | 12/1997 | Allen et al. | .................... | 700/213 |
| 6,292,709 B1 * | 9/2001 | Uhl et al. | ....................... | 700/226 |
| 6,539,360 B1 * | 3/2003 | Kadaba | .......................... | 705/28 |
| 6,740,836 B2 * | 5/2004 | Ryan et al. | .................... | 209/584 |
| 6,796,433 B2 * | 9/2004 | Daniels et al. | ................ | 209/384 |
| 6,819,777 B2 * | 11/2004 | Baker et al. | .................... | 382/101 |

(Continued)

FOREIGN PATENT DOCUMENTS

CN    101132866 A    2/2008
DE    102006059525 B3    4/2008

OTHER PUBLICATIONS

Chinese Office Action for Chinese Application No. 200980120143.3 dated Aug. 2, 2012.

*Primary Examiner* — Stefanos Karmis
*Assistant Examiner* — Michael E Butler
(74) *Attorney, Agent, or Firm* — Sughrue Mion, PLLC

(57) ABSTRACT

A method of sorting a plurality of articles (A, B, C), in which each article goes through a sorting installation in at least two passes, comprises the steps of recording the image of each article that is generated during the first sorting pass in a memory and in correspondence with a data item indicating a sorting outlet to which the article is directed during the first sorting pass. If an article is misrouted, a correctly routed reference article is chosen in the vicinity of the misrouted article in the sequence of articles obtained during the last sorting pass, the memory is searched (22-28) for an image of said correctly routed reference article, and, on the basis of said reference article image, a set of article images grouped together in the memory and that includes the image of the reference article is looked through (29-34) to identify an image of the misrouted article.

8 Claims, 2 Drawing Sheets

(56) References Cited

U.S. PATENT DOCUMENTS

| | | |
|---|---|---|
| 7,739,201 B2 * | 6/2010 | Witmond et al. .............. 705/333 |
| 2003/0038065 A1 * | 2/2003 | Pippin et al. .................. 209/584 |
| 2003/0208298 A1 * | 11/2003 | Edmonds ....................... 700/224 |
| 2004/0120547 A1 * | 6/2004 | Mampe et al. ................. 382/101 |
| 2005/0027392 A1 * | 2/2005 | Elliot et al. .................... 700/227 |
| 2005/0209977 A1 * | 9/2005 | Avant et al. ................... 705/402 |
| 2005/0259847 A1 * | 11/2005 | Genc et al. .................... 382/103 |
| 2006/0108266 A1 * | 5/2006 | Bowers et al. ................. 209/584 |
| 2006/0291691 A1 * | 12/2006 | Laws ............................. 382/101 |
| 2007/0215529 A1 | 9/2007 | Desprez et al. |
| 2008/0008379 A1 * | 1/2008 | Andel et al. ................... 382/141 |
| 2008/0116256 A1 * | 5/2008 | Martin et al. .................. 235/375 |
| 2008/0230449 A1 * | 9/2008 | Stemmle ........................ 209/584 |
| 2010/0040256 A1 * | 2/2010 | Rundle .......................... 382/101 |
| 2010/0324724 A1 * | 12/2010 | Elmenhurst ................... 700/226 |

\* cited by examiner

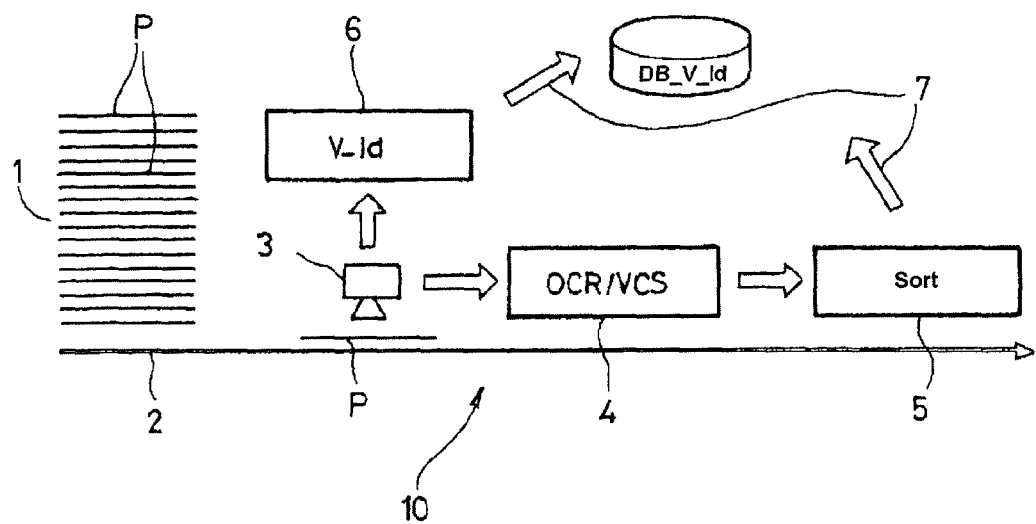
FIG_1
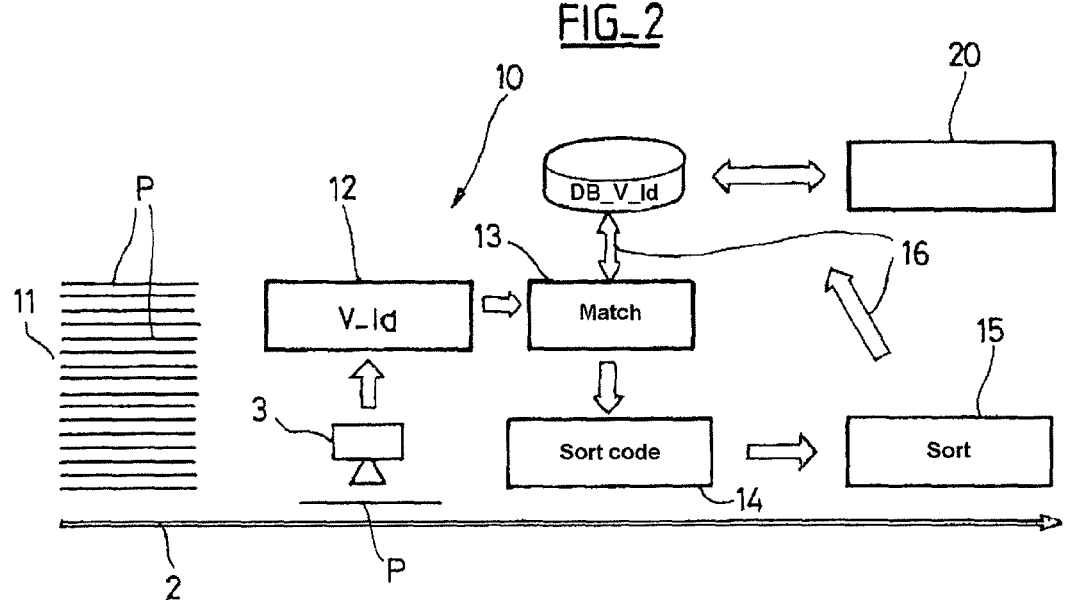
FIG_2

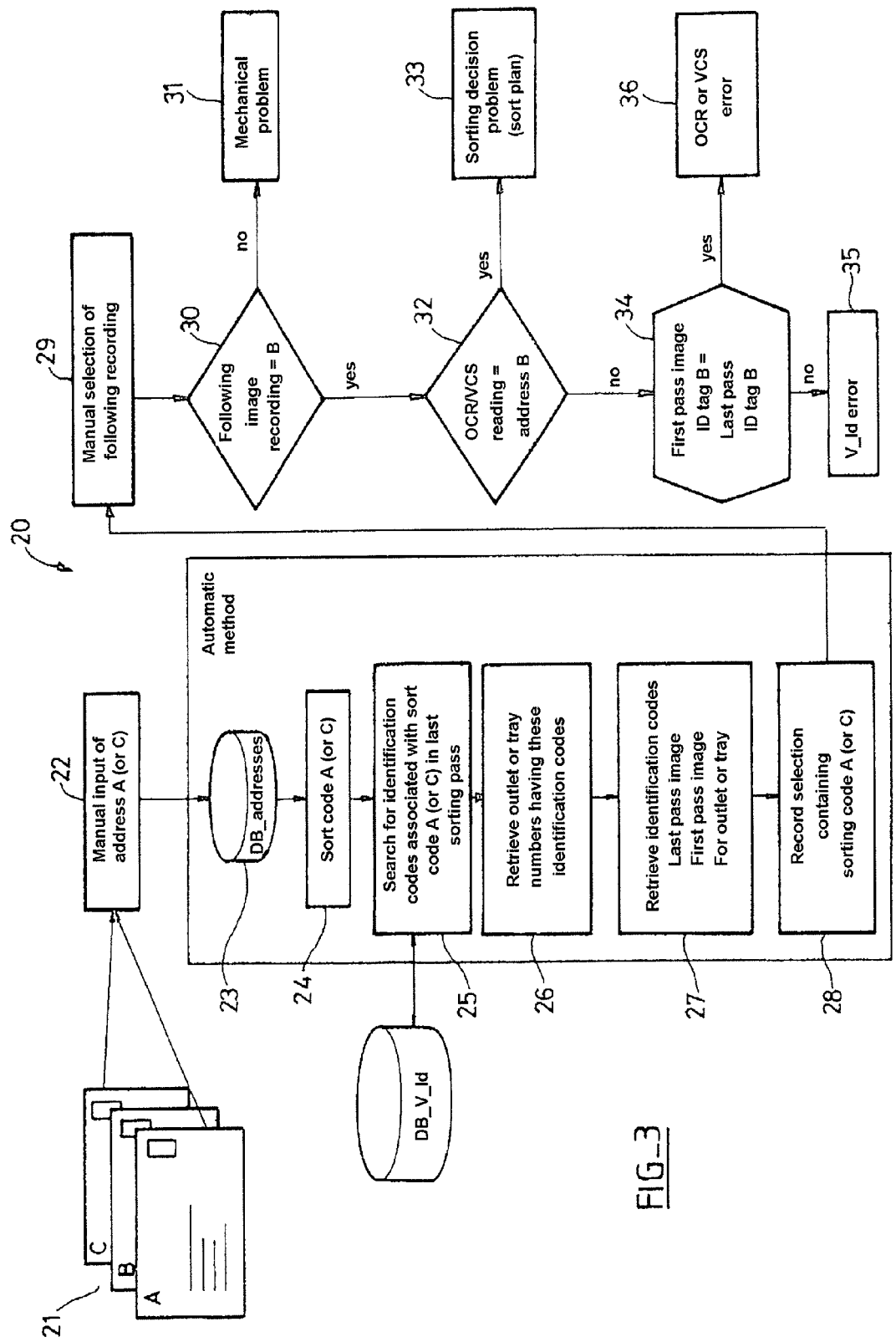
FIG_3

METHOD OF STORING A PLURALITY OF ARTICLES WITH INFORMATION BEING SCRUTINIZED

The invention relates to a method of sorting a plurality of articles, in which method each article has a surface provided with an indication of a routing point to which the article is to be routed, and in which method each article goes through a sorting installation in at least two passes. While a current article is passing through the installation on its first sorting pass, a digital image is generated of the surface of the article that bears said indication, said image of said indication is read automatically so as to direct the article towards a sorting outlet of the installation, a unique identifier for the article is also derived from the image, and said unique identifier is recorded in a database in correspondence with the image of the article and with the result of the reading. During each of the following sorting passes of each article through the installation, a current digital image of the current article bearing said indication is generated again in order to generate a current identifier for the article, and a match is sought between said current identifier and the identifiers recorded in the database during the first sorting pass of the articles, so as to direct the current article to a sorting outlet of the installation. During the last sorting pass, in the event of a match, the current image of each current article is also recorded in the database in correspondence with the identifier of the current article generated during the first sorting pass through the installation.

In such a method, the unique identifier of an article is thus derived from the image of said article. It is an image signature. Said identifier can have other attributes measured from the article itself, such as its weight, its length, its thickness, etc.

When sorting mailpieces, this type of identification is used to identify each mailpiece without marking by printing. Said image signature can have two components, namely an "image component" that characterizes the overall and local distributions of gray scale levels of the pixels in the image of the mailpiece, and a "postal component" that characterizes the indication of the routing point on the surface of the mailpiece at a non-syntactical analysis level. The construction of such an image signature is, in particular, described in Patent Document FR 2 841 673.

In a manner known per se, postal sorting installations suffer malfunctions resulting in one or more mailpieces being routed to erroneous destinations. Erroneous routing of a mailpiece can, for example, result from malfunctions of the system for automatically reading the destination postal address by optical character recognition (OCR), of the video-coding tools, or of the system for comparing the image signatures, or from mechanical failure of a sorting outlet switch, or indeed from two or more mailpieces being unstacked together in a bunch at the inlet of the installation, for example, etc. It can happen that it is at the time of delivery of the mail by the delivery person that an error of that type is detected. The misrouted mailpiece is then isolated from the other mailpieces to be delivered so as to be redirected in the right direction. The routing error must then be analyzed in order to correct the origin of the malfunction.

Patent Document DE-102006059525 describes a process of scrutinizing information for the purpose of analyzing the cause of erroneous routing of a mailpiece. That process consists in assessing postal sorting data on the basis of the destination address on the surface of the misrouted mailpiece so as to retrieve from the database the image of that mailpiece that was generated during the first sorting pass. Unfortunately, such a process can be implemented effectively only if it is possible automatically to reach the deepest assessment level for the destination address of the misrouted mailpiece. If that address is somewhat illegible for an automatic read system, or incorrect in part, it is not possible to reach that assessment level, and it is not possible to correct the origin of the malfunction.

An object of the invention is to propose a method of sorting a plurality of articles such as mailpieces, such as letters, magazines, or parcels, as defined above, but that is improved so as to scrutinize information with a view to being able systematically to identify the cause of erroneous routing of one or more articles, in particular of mailpieces that are identified without being marked in a sorting installation by using an identification technique for identification by image signature.

To this end, the invention provides a method of sorting a plurality of articles, in which method each article has a surface provided with an indication of a routing point to which the article is to be routed, and in which method each article goes through a sorting installation in at least two passes;

while a current article is passing through the installation on its first sorting pass, a digital image is generated of the surface of the article that bears said indication, said image of said indication is read automatically so as to direct the article towards a sorting outlet of the installation, a unique identifier for the article is also generated from the image, and said unique identifier is recorded in a database in correspondence with the image of the article and with the result of the reading; and during each of the following sorting passes of each article through the installation, a current digital image of the article bearing said indication is generated again in order to derive a current identifier for the article, and a match is sought between said current identifier and the identifiers recorded in the database during the first sorting pass of the articles through the installation, so as to direct the current article to a sorting outlet of the installation;

and in which method a search is made in the database for at least one image generated during a sorting pass in the installation for at least one misrouted article in order to scrutinize the information recorded for that article in the database;

said method being characterized in that, during said last sorting pass for each article through the installation, a grouping data item is recorded in correspondence with an image of said article in the database so as to obtain, in a memory, various groups of images corresponding to respective ones of the groups of articles in the sorting outlets, and the following steps are performed for the misrouted article in order to scrutinize the information:

searching (22-28) the database for an article image that is the image of a reference article that is correctly routed; and on the basis of said reference article image, looking through (29-34) a grouped set of article images including the image of the reference article so as to identify an image of the misrouted article.

The basic idea of the method of the invention is thus to use one or more mailpieces that are correctly sorted in a delivery round and that, in said delivery round, are in the immediate vicinity of the mailpiece that is misrouted and for which the origin of the misrouting is to be sought. For example, it is possible to choose the mailpiece that is immediately adjacent (in front of or behind) the misrouted mailpiece in the sequence of mailpieces that is obtained during the last sorting pass, i.e. in the delivery round. It can be considered that such a mailpiece adjacent to the misrouted mailpiece in the delivery round was directed to the same machine sorting outlet as the misrouted mailpiece. In a first stage, it is possible to go back to an image generated for said reference mailpiece in a sorting pass and that has been recorded in the database. It can be considered that the destination address on the reference mailpiece can be assessed to the deepest level since said reference mailpiece has been correctly routed. When the image of the reference mailpiece is found in the database, then by means of the grouping of the images that is compiled in the last sorting pass, it is possible to scroll through (including in looped manner) the grouped images in a certain order of presentation so as to compare the images by eye with the surface of the misrouted mailpiece, and thus find the image of said misrouted mailpiece so as to scrutinize information concerning it in greater depth.

The method of the invention is applicable to a postal sorting process in two sorting passes or in more than two sorting passes, it being possible for the sorting passes to be performed in a single sorting machine or in a more complex sorting installation comprising a plurality of sorting machines, e.g. disposed in outgoing and incoming sorting centers.

The invention also provides an installation for sorting a plurality of articles that includes a system for scrutinizing information.

Other characteristics and advantages of the method of the invention appear on reading the following description of an implementation illustrated by the drawings, in which:

FIG. 1 is a highly diagrammatic view showing how the first sorting pass for sorting mailpieces takes place with the method of the invention;

FIG. 2 is a highly diagrammatic view showing how a final sorting pass for sorting mailpieces (the last sorting pass) takes place with the method of the invention; and FIG. 3 is a flow chart showing the stage in which the information recorded during the various sorting passes is scrutinized to identify the cause of erroneous routing of a mailpiece.

In highly diagrammatic views, FIGS. 1 and 2 show mailpieces, which are letters P in this example, placed in a stack 1 in an inlet magazine of a postal sorting installation 10 for the purpose of being sorted into delivery order for a delivery round or "postman's walk". Blocks are used to represent the main steps of data-processing of the method of the invention during the first sorting pass (FIG. 1) and during the second sorting pass (FIG. 2).

It is considered below that the second sorting pass is, in this example, the last or final sorting pass for sorting the mailpieces P for the purpose of preparing a delivery round. Naturally, the method of the invention is also applicable to a sorting process having more than two sorting passes.

With reference to FIG. 1, during a first sorting pass, the mailpieces P in the stack are put into series and are moved in series by a conveyor 2 past a camera 3. The mailpieces P are, in principle, conveyed on edge and it should be considered that FIG. 1 (and also FIG. 2) shows the stack of mailpieces 1, the conveyor 2, and the camera 3 of the sorting machine in a plan view.

The camera 3 forms an image of the surface of the current mailpiece P that bears the delivery address of the mailpiece. This image is a digital image that can be used by a computer for the purpose of automatically reading the digital image of the delivery address at 4 by OCR or by a video-coding system (VCS).

The result of the reading at 4 (in particular a sort code, e.g. having 12 numerical characters) is used to control at 5 the conveyors and the switches of the installation in a manner such as to direct the current mailpiece to a sorting outlet corresponding to its delivery address.

In addition, an image signature V_Id is extracted from the digital image of the current mailpiece at 6, which image signature serves as a unique mailpiece identifier. Said signature is referenced by a unique number (ID tag) that is generally not printed on the surface of the current mailpiece. Said identification code (which is a kind of serial number) is recorded in the database during the first sorting pass in correspondence with the data set generated for each current mailpiece so as to constitute a memory access key for access to said data set recorded in the database DB_V_Id. In certain particular situations, such as when processing forwarded mail, it can be advantageous to print said identification code.

The data set made up of the digital image formed by the camera 3, and of the results of the reading at 4, including a sort code, is recorded (represented by arrows 7) in a database DB_V_Id in correspondence with the image signature V_Id of the current mailpiece. This data set serves for any subsequent scrutiny that might be performed to analyze misrouting of one or more mailpieces.

This process of extracting and recording data is performed for each mailpiece P during the first sorting pass and, where applicable during each of the subsequent sorting passes.

At the end of the first sorting pass, all of the mailpieces are retrieved from the sorting outlets of the installation and are fed back into the inlet of the installation for the next sorting pass. For reasons of simplicity, it is considered that the inlet for the next pass is the inlet of the sorting machine 10 that was used for the first sorting pass, and that the delivery round with the mailpieces P is prepared in two sorting passes.

FIG. 2 shows the steps of the method of the invention during the second and last sorting pass after which the mailpieces are in sequence for delivery by the delivery person.

The mailpieces P are thus presented once again in a stack 11 at the inlet of the machine in a certain order. They are put into series and are conveyed on edge by a conveyor 2 so as to be taken past the camera 3. The camera 3 forms a current digital image for a current mailpiece P, said current image bearing the delivery address, and, on the basis of said digital image, a current image signature is extracted at 12 in the same manner as in step 6.

This current signature V_Id for a current mailpiece is then compared at 13 with the image signatures recorded in the database during the first sorting pass, so as to detect any matching.

When a match is detected in step 13, and because the signatures are associated in the memory with the results of the reading, the system, at step 14, retrieves a sort code from the database DB_V_Id that serves, at step 15, to direct the current mailpiece to a sorting outlet.

In FIG. 2, the arrows 16 indicate that, in the event of a match, the data set made up both of the image of the current mailpiece formed in the second and last sorting pass and of the current "fingerprint" formed in the second sorting pass, is recorded in the database DB_V_Id in correspondence with the identification code (ID tag) assigned to the mailpiece (retrieved by association in the memory of the signatures with the identification codes).

In accordance with the invention, during the last sorting pass, a data item is retrieved that indicates the sorting outlet to which the current mailpiece is directed, or the sorting outlet tray in which the current mailpiece is stored, and said data item is recorded in the memory in the database in correspondence with the identification code of the mailpiece.

Consequently, in the last sorting pass for sorting an article, the data set recorded in the memory for a mailpiece with a view to making subsequent scrutiny of the information possible comprises at least one mailpiece identification code, the images of the mailpiece formed in the first and in the last sorting passes, the result of the address reading in the first sorting pass, the image signatures generated in the first and in the last sorting passes, and a data item indicating the sorting outlet or the number of the sorting outlet in the last sorting pass.

This process represented by the steps 12 to 16 is repeated for each mailpiece.

At the end of the last sorting pass, by means of the data indicating sorting outlets or numbers of sorting outlet trays, various groups of images of mailpieces have been compiled in the database, which groups of images correspond to respective ones of the various groups of mailpieces in the sorting outlets or in the sorting outlet trays.

Each group of images can thus comprise a set of several tens of images. In addition, if a time stamp is assigned to each image recorded in the last sorting pass, or if an order number for arrival in a sorting outlet is assigned thereto, it is possible to put the images of the mailpieces in each group of images into chronological order of arrival of the mailpieces in the sorting outlet. This chronological order can serve to sequence the data sets in each group of images. Naturally, the data indicating the sorting outlet can be supplemented by data indicating the sorting machine, the sorting center, and the date of sorting (etc.) in order to facilitate the process of scrutinizing information, as described below.

Naturally, and in non-limiting manner, the data set recorded for a mailpiece during the entire sorting process can also include images and image signatures formed during intermediate sorting passes between the first sorting pass and the last sorting pass.

FIG. 3 shows a sequence 21 of three mailpieces A, B, and C in a delivery round for illustrating the process of scrutinizing information with the method of the invention.

In said sequence 21, it should be considered that the mailpieces A and C are correctly routed whereas the mailpiece B is misrouted in that its delivery point in the delivery round does not correspond to the destination address.

There follows a description of the operation of the system 20 for scrutinizing information recorded in the database DB_V_Id. Naturally, it should be understood that the system 20 can use information that has been copied from the database DB_V_Id.

In step 22, the delivery person who is to deliver the mailpieces, or some other postal operator detects that the mailpiece B is misrouted (or is in an incorrect delivery direction). The mailpiece B must thus be isolated so as to be rerouted towards a correct direction. The delivery person notes the destination address of the misrouted mailpiece.

In accordance with the invention, and in the sequence 21, the delivery person also notes the destination address borne by at least one correctly routed mailpiece that is in the vicinity of the mailpiece B, and that is preferably the one or two mailpieces that are closest to the mailpiece B, i.e. the mailpieces referenced A and C in this example.

By way of example, the addresses on the mailpieces A, B, and C can be noted merely by photographing the surfaces of the mailpieces A, B, and C that bear their destination addresses. Naturally, a plurality of misrouted mailpieces might follow one another in a sequence in the delivery round, in which case the delivery person chooses as a reference mailpiece at least that mailpiece that is situated at the front (or at the back) of this succession of misrouted mailpieces in the sequence of the delivery round.

The information is scrutinized from a terminal having a display screen in the system 20 for accessing the contents of the database DB_V_Id (or a copy thereof as indicated above), said terminal being arranged so as to make requests for searching for and displaying information extracted from the database.

By way of example, the process of scrutinizing the mailpiece B starts with the destination address of the mailpiece A being input into the terminal that is arranged to transform it into a sort code at step 24. A postal address database DB_address 23 can be necessary for this transformation from a postal address to a machine sort code.

On the basis of the sort code generated at step 24, the terminal is arranged to respond to a request by retrieving a data set from the database that can, in practice, require a plurality of successive accesses to the database as a function of the indexing of the data fields of the database. As indicated above, and by way of example, it is considered that the identification code constitutes a primary access key in the database. Therefore, going back through the information in the database can start with an access to the database for the purpose of retrieving all of the identification codes of mailpieces associated in the memory with the same sort code as that generated at step 24. Then, in step 26, via another access to the database, the terminal retrieves the data items indicating the sorting outlet (or storage tray) that is associated (by memory correspondence) with each of the identification codes found in step 25. Then, finally, at step 27, via another access to the database, the terminal retrieves the first sorting pass and last sorting pass images associated (by memory correspondence) with the identification codes found in step 25.

The number of identification codes found in step 25 can be reduced automatically by means of a selection mask relating to the date and time of the last sorting pass to be considered for the mailpiece A, which can be input at step 22 insofar as said mask can be compared with corresponding information recorded in the database DB_V_Id during the sorting process for sorting the mailpiece A.

In step 28, for reasons of simplicity, consideration is given to the case when a single identification code is obtained in step 25.

The first and second sorting pass images are displayed on the display screen of the terminal and the operator can check that said images do indeed correspond to the surface of the reference mailpiece A.

When a plurality of candidates have been obtained in step 25, the terminal can be arranged to enable successive mailpiece images corresponding to said candidates to be displayed on the screen. By checking by eye, the operator can stop the scrolling so as to select the mailpiece image that corresponds to the surface of the reference mailpiece A.

At this stage, the terminal of the scrutiny system therefore displays the image of the surface of the reference mailpiece A on the screen.

Due to the images being grouped together in the memory in a group compiled during the last sorting pass, it is possible for each of the last sorting pass images grouped together with the image of the mailpiece A to be presented on the display screen (step 29) successively and one-by-one at the request of the operator, e.g. in response to moving a cursor.

Insofar as the last sorting pass images are sequenced in a chronological order, it is possible, by means of the cursor, to obtain display of the mailpiece image that follows or, alternatively, that precedes the reference mailpiece image in the memory.

At step 30, the operator checks by eye the mailpiece image that precedes the reference mailpiece image A.

If the displayed mailpiece image does not correspond to the surface of the misrouted mailpiece B, it can be considered that the cause of the erroneous routing of the mailpiece B is due to a mechanical problem, that cause being represented by the block 31. The mechanical problem might be related to the fact that the mailpiece B was stuck in a bunch during the automatic machine handling. It might be related to a stacking or unstacking problem. Finally, it might be due to mishandling by an operator when transferring the mailpieces between the various sorting passes. The operator can return, by means of the cursor, to the display of the image of the mailpiece A so as to examine said image in more detail, e.g. with a magnifying tool so as to show up any presence of an outline of another mailpiece lying behind the outline of the mailpiece A. If this checking does not yield any result, the operator can continue the analysis by looking through other mailpiece images by going over them with the cursor to deepen the analysis of the cause of the misrouting.

If, at step 30, the displayed image now corresponds to the surface of the mailpiece B, the operator continues the scrutiny in step 32 by comparing the address actually on the mailpiece B with the result of the OCR or video-coding reading that is recorded in the database DB_V_Id.

If, at step 32, the operator establishes that the address actually on the mailpiece B corresponds to the results of the reading in the first sorting pass, that means that the cause of the misrouting is related to the sorting algorithms themselves, as represented by the block 33.

If, at step 32, the address actually on the mailpiece B does not correspond to the results of reading in the first sorting pass, then the operator continues the scrutiny at step 34 by analyzing, on the screen, the image attributed to the mailpiece B and recorded in the first sorting pass.

If, at step 34, the two images of the mailpiece B in the first sorting pass and in the last sorting pass do not correspond to the same mailpiece, that means that the cause of the misrouting is related to an error in the process of identifying mailpieces by image signature, as represented by the block 35. During a conveying problem, this might result from the process of generating image signatures, e.g. leading to an erroneous signature being generated, or otherwise it might result from the process of comparing the image signatures for the purpose of finding matches between them. In this step 34, the terminal can be arranged to display all of the images attributed to the mailpiece B that are recorded in each sorting pass. It is then possible to deduce therefrom the sorting pass in which the identification error took place.

If, at step 34, the two images of the mailpiece B that are displayed on the screen correspond to the same mailpiece, that means that the cause of the misrouting is related to an error in the OCR automatic address recognition process or to an error by a video-coding operator, as represented by the block 36.

Naturally, the scrutiny system of the invention enables the operator to observe the sequenced mailpiece images before or after the image of the mailpiece A so as to identify any mailpiece image that corresponds to the surface of the mailpiece B. It is also possible to scrutinize information on the basis of a plurality of reference mailpieces taken by the delivery person in the vicinity of the mailpiece B so as to enlarge the search area for searching for the image of the mailpiece B.

The invention claimed is:

1. A method of sorting a plurality of articles (A, B, C), in which method each article has a surface provided with an indication of a routing point to which the article is to be routed, and in which method each article goes through a sorting installation in at least two passes;

while a current article is passing through the installation on its first sorting pass, a digital image is generated of the surface of the article that bears said routing point's indication, said digital image of said routing point's indication is read automatically (4) so as to direct the article towards a sorting outlet of the installation accordingly, a unique image signature for the article is also extracted (6) from the digital image, and said unique image signature is recorded (7) in a database in correspondence with the digital image of the article and with the result of the reading of the routing point's indication so as for said image signature to constitute a memory access key for access to the digital image of the article and to the routing point's indication recorded in the database; and during each of the following sorting passes of each article through the installation, a current digital image of the article bearing said routing point's indication is generated again in order to extract (12) a current image signature for the article, and a match (13) is sought between said current image signature and the unique image signatures recorded in the database during the first sorting pass of the articles through the installation, so as to, when a match is detected between said current image signature and the unique image signatures, retrieve a sort code corresponding to said routing point's indication associated in the database with said unique image signature matching with said current image signature, and direct the current article to a sorting outlet of the installation accordingly to said routing point's indication;

and in which method a search (20) is made in the database for at least one digital image generated during a pass in the sorting installation for at least one misrouted article in order to scrutinize the routing point's information recorded for that article in the database;

said method being characterized in that, during said last sorting pass for each article through the installation, both said unique image signature and said routing point's information of said unique image signature are recorded in correspondence with said digital image of said current article in the database and with a sorting outlet storage tray to which the current article is directed so as to obtain, in a memory, various groups of digital images corresponding to respective ones of the groups of articles in the sorting outlets, and the following steps are performed for the misrouted article in order to scrutinize the information:

searching (22-28) the database in the immediate vicinity of said digital image of said misrouted article for an article digital image that is the digital image of a reference article that is correctly routed; and scrutinizing said misrouted article starting with inputting the routing point's information of said reference article, transforming said routing point's information of said reference article into a sort code identifying the corresponding sorting outlet, retrieving all of the image signature of articles associated in the memory with the same sorting outlet, retrieving the first sorting pass and last sorting pass digital images associated with the unique image signatures found, checking that at least one of said digital images corresponds to the digital image of a reference article, and comparing said digital image of a reference article with the digital image of the misrouted article to reach a conclusion concerning the misrouting.

2. A method according to claim 1, in which said grouping data item is a data item indicating one of a sorting outlet and a sorting outlet storage tray to which the article is directed.

3. A method of sorting a plurality of articles according to claim 1, in which if during the comparison, said image of a reference does not correspond to the image of the misrouted article, conclusion is made that misrouting is due to a mechanical problem.

4. A method of sorting a plurality of articles according to claim 1, in which if during the comparison, said image of a reference does correspond to the image of the misrouted article, comparison is made between the routing point's information of said misrouted article resulting from automatic reading and the routing point's information recorded in the database.

5. A method of sorting a plurality of articles according to claim 4, in which if during the comparison, said routing point's information of said misrouted article resulting from automatic reading does correspond to the routing point's information recorded in the database, conclusion is made that misrouting is due to a sorting problem.

6. A method of sorting a plurality of articles according to claim 4, in which if during the comparison, said routing point's information of said misrouted article resulting from automatic reading does not correspond to the routing point's information recorded in the database, comparison is made between the first sorting pass image of the misrouted article and the last sorting pass image of the misrouted article.

7. A method of sorting a plurality of articles according to claim 6, in which if during the comparison, said first sorting pass image of the misrouted article does not correspond to said last sorting pass image of the misrouted article, conclusion is made that misrouting is due to an error in identifying the mailpieces by image signature.

8. A method of sorting a plurality of articles according to claim 6, in which if during the comparison, said first sorting pass image of the misrouted article does correspond to said last sorting pass image of the misrouted article, conclusion is made that misrouting is due an error in automatic reading of said routing point's indication.

* * * * *